(12) United States Patent
Jia et al.

(10) Patent No.: US 9,841,034 B2
(45) Date of Patent: Dec. 12, 2017

(54) FAN AND ELECTRONIC APPARATUS

(71) Applicants: Beijing Lenovo Software Ltd., Beijing (CN); Lenovo (Beijing) Limited, Beijing (CN)

(72) Inventors: Zizhou Jia, Beijing (CN); Ying Sun, Beijing (CN); Zhigang Na, Beijing (CN)

(73) Assignees: BEIJING LENOVO SOFTWARE LTD., Beijing (CN); LENOVO (BEIJING) LIMITED, Beijing (CN)

( * ) Notice: Subject to any disclaimer, the term of this patent is extended or adjusted under 35 U.S.C. 154(b) by 552 days.

(21) Appl. No.: 14/199,396

(22) Filed: Mar. 6, 2014

(65) Prior Publication Data

US 2014/0293539 A1 Oct. 2, 2014

(30) Foreign Application Priority Data

Mar. 28, 2013 (CN) .......................... 2013 1 0105522

(51) Int. Cl.
*F04D 29/42* (2006.01)
*G06F 1/20* (2006.01)

(52) U.S. Cl.
CPC ......... *F04D 29/4226* (2013.01); *G06F 1/203* (2013.01)

(58) Field of Classification Search
None
See application file for complete search history.

(56) References Cited

U.S. PATENT DOCUMENTS

| 7,255,532 B2* | 8/2007 | Zheng | F04D 17/04 |
| | | | 415/183 |
| 2006/0024160 A1* | 2/2006 | Horng | F04D 29/4226 |
| | | | 415/206 |
| 2007/0222331 A1* | 9/2007 | Horng | F04D 27/004 |
| | | | 310/268 |
| 2010/0080719 A1* | 4/2010 | Boggess, Jr. | F04D 25/0613 |
| | | | 417/423.14 |

(Continued)

FOREIGN PATENT DOCUMENTS

| CN | 1687598 A | 10/2005 |
| CN | 1737380 A | 2/2006 |

(Continued)

*Primary Examiner* — Logan Kraft
*Assistant Examiner* — Jason Davis
(74) *Attorney, Agent, or Firm* — Kinney & Lange, P.A.

(57) ABSTRACT

A fan and an electronic apparatus are disclosed. The fan comprises a housing and a blade wheel. The housing is shaped as a hollow column, a thickness of the housing is less than a preset thickness, a radial air inlet and an air outlet are disposed in a side of the housing, and the blade wheel is mounted in the housing and shaped as a cylinder. The housing is also provided with an axial air inlet disposed in at least one bottom surface of the housing so that air can enter the housing from the bottom surface by rotating the blade wheel. The heat dissipation performance of the fan is improved, the present invention solves the technical problem in the prior art that thinning of the fan in the super-thin electronic apparatus will lead to reduction in heat dissipation performance, and achieving technical effects that the electronic apparatus has high heat dissipation performance while super thinning the electronic apparatus.

7 Claims, 4 Drawing Sheets

(56) References Cited

U.S. PATENT DOCUMENTS

2012/0026677 A1* 2/2012 Bhutani .............. F04D 25/0613
361/679.48

FOREIGN PATENT DOCUMENTS

| CN | 101994707 | A | 3/2011 |
| CN | 201972963 | U | 9/2011 |
| CN | 102562668 | A | 7/2012 |
| JP | 2006220021 | A | 8/2006 |

* cited by examiner

FAN AND ELECTRONIC APPARATUS

BACKGROUND OF THE INVENTION

1. Field of the Invention

The present invention relates to a mechanical field and in particular to a fan and an electronic apparatus.

2. Description of the Related Art

Currently, various electronic products on the market, including desktop computers, integrated computers, notebook computers and the like, are all developing to trend towards higher and higher performance and less and less volume and thickness. However, the high performance, small volume and thin thickness necessarily cause a great deal of heat to be generated and densely aggregated in the electronic products when they operate. If the heat is aggregated to some degree, devices such as CPU in the electronic products will be burned, as a result, the electronic products cannot operate. In order to control the temperature in the electronic products to ensure stable operation of the electronic products while reducing a size of the products, requirements for performance and size of heat dissipation parts are higher and higher.

Among various heat dissipation methods, wind-cooling heat dissipation, i.e., taking away heat in the electronic products by means of a fan, is the most common heat dissipation method since its manufacture and installation are relatively simple and its implementation cost is lower. Currently, there are two types of fans mounted to various electronic products having a small volume and a thin thickness: one is a centrifugal fan, such as a kitchen ventilator characterized in that air flow is sucked in an axial direction of the fan and thrown in a circumferential direction by a centrifugal force; and the other type is an axial fan, such as a household electric fan, characterized in that air flow flows through in an axial direction of fan blades.

However, during contriving technical solutions of the present application by the inventors of the present application, the inventors found at least the following technical problems in the above technique.

With development in super thinning of the electronic products such as notebook computers and integrated computers, the fans for the electronic products are required to be thinner and better in performance. However, blades of the centrifugal fan and the axial fan are required to be inclined or twisted to have a helical shape. Once the fan is thinned, the effect of the helical shape is reduced, thereby the heat dissipation performance of the fans is greatly decreased.

Therefore, increase in size of the fan will limit development in super thinning of the product, while decrease in size of the fan will lead to great reduction in heat dissipation performance of the fan, and the product cannot operate normally.

In other words, there is a technical problem in the super-thin electronic apparatus in the prior art that thinning of the fan will lead to reduction in heat dissipation performance.

SUMMARY OF THE INVENTION

The present invention has been made to solve or alleviate at least one aspect of the problems and/or defects in the prior arts.

An object of the present invention is to solve the technical problem in the prior art that thinning of the fan in the super-thin electronic apparatus will lead to reduction in heat dissipation performance, and to achieve technical effects that the electronic apparatus has high heat dissipation performance while super thinning the electronic apparatus, by providing a fan and an electronic apparatus.

According to an aspect of the invention, there is provided a fan, comprising a housing and a blade wheel, wherein the housing is shaped as a hollow column, a thickness of the housing is less than a preset thickness, a radial air inlet and an air outlet are disposed in a side of the housing, the blade wheel is mounted in the housing and shaped as a cylinder; and wherein at least one bottom surface of the housing is also provided with an axial air inlet so that air can enter into the housing from the bottom surface by rotating the blade wheel.

Preferably, the axial air inlet is disposed in a circular ring-shaped region in the bottom surface of the housing, wherein a circular ring center of the circular ring-shaped region is a point at which an axis of the blade wheel intersects the bottom surface of the housing, an inner ring radius of the circular ring-shaped region is equal to a distance from a blade root of the blade wheel to the axis of the blade wheel, and an outer ring radius of the circular ring-shaped region is equal to a distance from a blade outer edge of the blade wheel to the axis of the blade wheel.

Preferably, the axial air inlet has a shape of a sectorial ring or a crescent shape.

Preferably, a ring center of the sectorial ring of the sectorial ring-shaped axial air inlet is the point at which the axis of the blade wheel intersects the bottom surface of the housing.

Optionally, in particular the housing is a housing formed of a thin metal plate by pressing, a housing formed of plastic by molding, or a housing formed of alloy by molding.

Preferably, the blade wheel comprises at least two forward-curved blades.

According to another aspect of the invention, an embodiment of the present application also provides an electronic apparatus comprising a case, the electronic apparatus further comprising a fan made according to the method described in the above technical solution, the radial air inlet and the axial air inlet of the fan being located inside the case; and a positioning device for fixing the fan to the case, wherein hot air inside the case can be discharged to an outside of the case through the air outlet of the fan.

At least one of the technical solutions provided in the embodiments of the present application has at least the following technical effects or advantages.

1. Since a cross flow fan having a cylindrical blade wheel and forward-curved blades is adopted as a heat dissipation fan, the influence of thinning of the thickness of the fan on its heat dissipation performance is less so that the effect of thinning of the thickness of the heat dissipation fan can be achieved. This is because the blades of the blade wheel of the cross flow fan are not required to be distributed in a helical shape as the blades of the centrifugal fan and the axial fan in the prior art so that the effect of the helical shape of the blades will not be reduced due to thinning of the fan.

2. Since at least one bottom surface of the cross flow fan is provided with an axial air inlet, air outside the housing of the fan enters into the housing under the influence of a wind pressure and an air flow generated when the blades of the blade wheel of the fan rotate, thereby increasing an air input of the fan and improving heat dissipation performance.

3. The axial air inlet is disposed in the circular ring-shaped region in the bottom surface of the housing of the fan. The center of the circular ring-shaped region is the point at which the axis of the blade wheel intersects the bottom surface of the housing, the inner ring radius is equal to the distance from the blade root of the blade wheel to the axis of the blade wheel, and the outer ring radius is equal to the distance from the blade outer edge of the blade wheel to the axis of the blade wheel. Therefore, air outside the bottom surface of the housing of the fan is in more effective contact with the blades of the blade wheel, thereby increasing an air input of the fan and improving heat dissipation performance.

DETAILED DESCRIPTION OF THE EMBODIMENTS

Embodiments of the present application solve the technical problem in the prior art that thinning of the fan in the super-thin electronic apparatus will lead to reduction in heat dissipation performance, by providing a fan and an electronic apparatus.

In order to solve the existing technical problem that thinning of the fan in the super-thin electronic apparatus will lead to reduction in heat dissipation performance, the technical solutions in the embodiment of the present application provide the following general inventive concept.

A cross flow fan is adopted as a heat dissipation fan. As a result, the influence of thinning of the thickness of the fan on its heat dissipation performance is less so that the technical effect of thinning of the thickness of the heat dissipation fan can be achieved. This is because the blades of the blade wheel of the cross flow fan are not required to be distributed in a helical shape as the blades of the centrifugal fan and the axial fan in the prior art so that the effect of the helical shape of the blades will not be reduced due to thinning of the fan. In addition, at least one bottom surface of the cross flow fan is provided with the axial air inlet, and the axial air inlet is disposed in the circular ring-shaped region in the bottom surface of the housing of the fan. The center of the circular ring-shaped region is the point at which the axis of the blade wheel intersects the bottom surface of the housing, the inner ring radius is equal to the distance from the blade root of the blade wheel to the axis of the blade wheel, and the outer ring radius is equal to the distance from the blade outer edge of the blade wheel to the axis of the blade wheel. Therefore, air outside the bottom surface of the housing of the fan is in more effective contact with the blades of the blade wheel, and more external air enters into the housing under the influence of a wind pressure and an air flow generated when the blades of the blade wheel of the fan rotate, thereby effectively solving the technical problem in the prior art that thinning of the fan in the super-thin electronic apparatus will lead to reduction in heat dissipation performance, and thus achieving technical effects that the electronic apparatus has better heat dissipation performance while super thinning the electronic apparatus.

In order to better understand the above technical solutions, a further description of the above technical solutions will be made as below with reference to embodiments of the present invention taken in conjunction with the accompanying drawings.

Embodiment 1

Figure 1A:
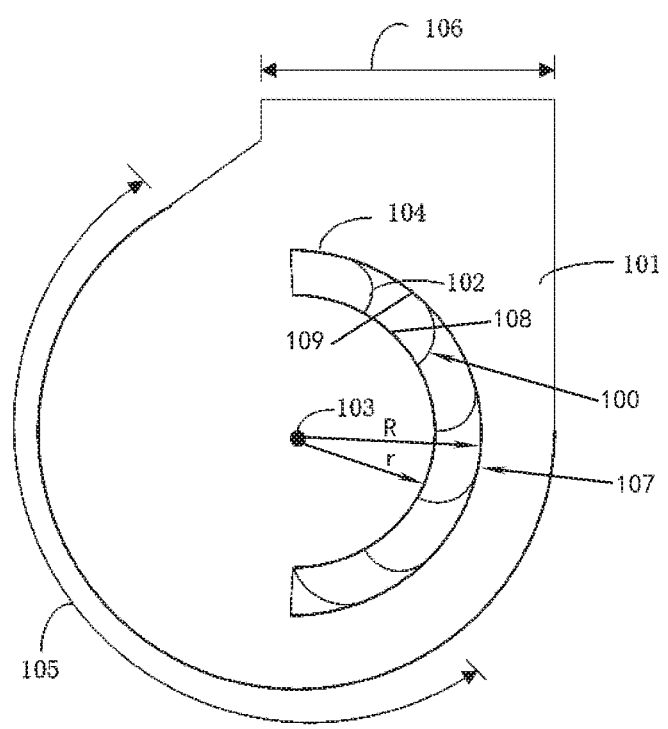
FIGS. 1A and 1B are schematic views of a fan having an axial air inlet in the shape of a sectorial ring according to an embodiment of the present application.
Figure 1B:
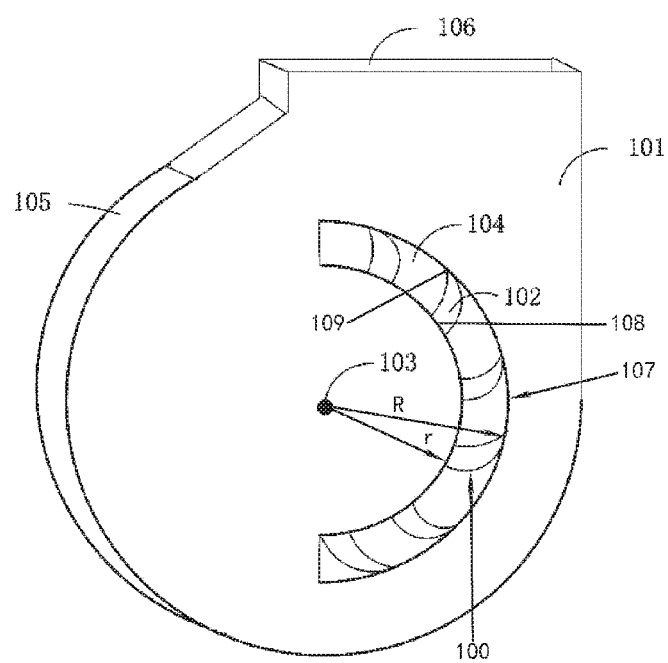

As shown in FIGS. 1A and 1B, a fan and in particular a super-thin cross flow fan is described in the embodiment of the present application. The fan comprises a housing 101 and a blade wheel 100. The housing 101 is shaped as a hollow column. A thickness of the housing is configured to be less than a preset thickness For example, the thickness is 2 cm. Alternatively the thickness of the housing may also be 1 cm, or 3 cm. For purpose of brevity, various alternative values of the thickness of the housing are not illustrated in this embodiment. A radial air inlet 105 and an air outlet 106 are disposed in a side of the housing 101. The blade wheel 100 is mounted in the housing and shaped as a cylinder. The super-thin fan specifically comprises:

an axial air inlet 104 disposed in at least one bottom surface of the housing 101. One bottom surface of the housing 101 may be provided with one or more axial air inlets 104, or each of two bottom surfaces of the housing 101 may be provided with one or more axial air inlets 104. For purpose of brevity, various alternative arrangements are not illustrated one by one in the embodiment of the present application. With the axial air inlet 104, air can enter into the housing from the bottom surface of the housing 101 by rotating blades 102 of the blade wheel.

In addition, the axial air inlet 104 may be disposed in a circular ring-shaped region 107 in the bottom surface of the housing 101. A circular ring center of the circular ring-shaped region is a point 103 at which an axis of the blade wheel intersects the bottom surface of the housing, an inner ring radius r of the circular ring-shaped region 107 is equal to a distance from a root 108 of the blade 102 of the blade wheel to the axis of the blade wheel, and an outer ring radius R of the circular ring-shaped region 107 is equal to a distance from an outer edge 109 of the blade 102 of the blade wheel to the axis of the blade wheel.

Specifically, the axial air inlet 104 is disposed in the circular ring-shaped region 107 in the bottom surface of the housing 101, the center of the circular ring-shaped region is the point 103 at which the axis of the blade wheel intersects the bottom surface of the housing, the inner ring radius r of the circular ring-shaped region 107 is equal to the distance from the root 108 of the blade 102 of the blade wheel to the axis of the blade wheel, and the outer ring radius R of the circular ring-shaped region 107 is equal to the distance from the outer edge 109 of the blade 102 of the blade wheel to the axis of the blade wheel. Therefore, contact effect between the blades 102 of the blade wheel and air outside the bottom surface of the housing 101 can be improved, and an air input of the axial air inlet 104 can be improved.

Furthermore, the axial air inlet 104 has a shape of a sectorial ring. The axial air inlet 104 may also have a crescent shape, a polygonal shape, or a patterned shape. For purpose of brevity, various alternative shapes of the axial air inlet 104 are not illustrated one by one in the embodiment of the present application.

In addition, a ring center of the sectorial ring of the sectorial ring-shaped axial air inlet 104 is the point 103 at which the axis of the blade wheel intersects the bottom surface of the housing.

Specifically, this embodiment adopts the sectorial ring-shaped axial air inlet 104 of which the ring center is the point 103 at which the axis of the blade wheel intersects the bottom surface of the housing, and which has a shape similar to the shape of a circular ring-shaped distribution region capable of improving contact effect between the blades 102 of the blade wheel and air outside the bottom surface of the housing 101 and suitable for disposing the axial air inlet. As a result, contact effect between the blades 102 of the blade wheel and air outside the bottom surface of the housing 101 can be improved, and an air input of the axial air inlet 104 can be improved.

Furthermore, the housing 101 of the fan is a housing formed of alloy by molding. Alternatively the housing 101 may be a housing formed of plastic by molding, or a housing formed of a thin metal plate by pressing. For purpose of brevity, various alternative forming methods of the housing are not illustrated one by one in the embodiment of the present application.

Furthermore, a number of the blades 102 of the blade wheel is at least two. The blades 102 are forward-curved blades. The blades 102 of the blade wheel are in contact with air outside the housing 101 through the axial air inlet 104 in the housing 101.

The technical solutions in the above embodiments of the present application have at least the following technical effects or advantages.

In the structure of the fan provided by the present invention, a cross flow fan is adopted as a heat dissipation fan of a super-thin electronic apparatus. As a result, the influence of thinning of the thickness of the fan on its heat dissipation performance is less so that the technical effect of thinning of the thickness of the heat dissipation fan can be achieved. This is because the blades 102 of the blade wheel of the cross flow fan are not required to be distributed in a helical shape as the blades of the centrifugal fan and the axial fan in the prior art so that the effect of the helical shape of the blades will not be reduced due to thinning of the fan.

Furthermore, in order to ensure heat dissipation effect of the fan after it has been thinned, in the embodiment of the present application, at least one bottom surface of the housing 101 of the super-thin fan is also provided with an axial air inlet 104. As a result, air outside the housing 101 enters into the housing under the influence of a wind pressure and an air flow generated when the blades 102 of the blade wheel rotate, thereby increasing an air input of the super-thin fan and thus improving heat dissipation performance.

In addition, in order to further improve heat dissipation performance, the embodiment of the present application also adopts the sectorial ring-shaped axial air inlet 104 of which the ring center is the point 103 at which the axis of the blade wheel intersects the bottom surface of the housing, and which is located in the circular ring-shaped region in the bottom surface of the housing 101. The center of the circular ring-shaped region is the point 103 at which the axis of the blade wheel intersects the bottom surface of the housing, the inner ring radius is equal to the distance from the root of the blade 102 of the blade wheel to the axis of the blade wheel, and the outer ring radius is equal to the distance from the outer edge of the blade 102 of the blade wheel to the axis of the blade wheel. Therefore, air outside the bottom surface of the housing 101 is in more effective contact with the blades 102 of the blade wheel, thereby increasing an axial air input of the super-thin fan and thus improving heat dissipation performance.

Embodiment 2

Figure 2:
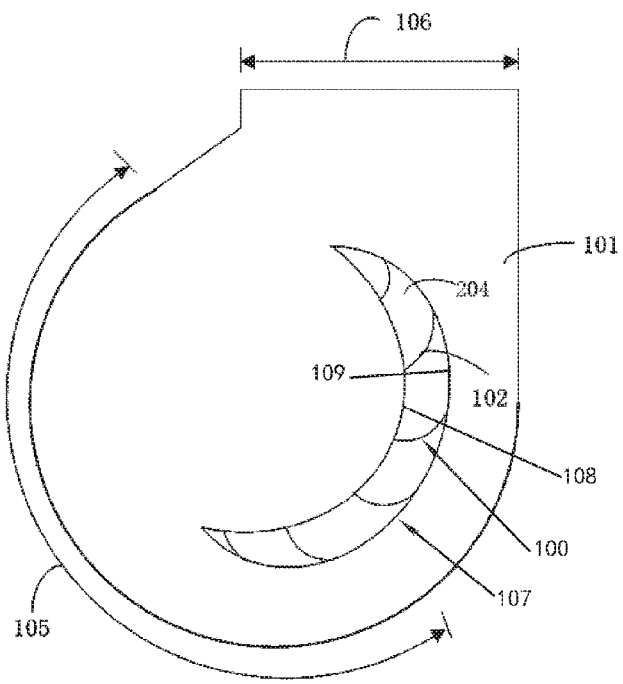
FIG. 2 is a schematic view of a fan having an axial air inlet in the shape of a crescent according to an embodiment of the present application.

As shown in FIG. 2, a fan and in particular a super-thin cross flow fan are described in the embodiment of the present application. The super-thin fan according to the embodiment comprises a housing 101, blades 102 of a blade wheel 100, a radial air inlet 105, and an air outlet 106 as formed according to the method described in the first embodiment. The super-thin fan further comprises: an axial air inlet 204 disposed in at least one bottom surface of the housing 101. One bottom surface of the housing 101 may be provided with one or more axial air inlets 204, or each of two bottom surfaces of the housing 101 may be provided with one or more axial air inlets 204. For purpose of brevity, various alternative arrangements are not illustrated one by one in the embodiment of the present application. With the axial air inlet 104, air can enter into the housing from the bottom surface of the housing 101 by rotating blades 102 of the blade wheel.

In addition, referring to FIGS. 1A and 1B, the axial air inlet 204 may be disposed in a circular ring-shaped region 107 in the bottom surface of the housing 101. A circular ring center of the circular ring-shaped region is a point 103 at which an axis of the blade wheel intersects the bottom surface of the housing, an inner ring radius r of the circular ring-shaped region 107 is equal to a distance from a root 108 of the blade 102 of the blade wheel to the axis of the blade wheel, and an outer ring radius R of the circular ring-shaped region 107 is equal to a distance from an outer edge 109 of the blade 102 of the blade wheel to the axis of the blade wheel.

Furthermore, the axial air inlet 204 has a crescent shape.

Furthermore, the blades 102 of the blade wheel are in contact with air outside the housing 101 through the axial air inlet 204 in the housing 101.

The technical solutions in the above embodiment of the present application have at least the following technical effects or advantages.

In the present invention, a cross flow fan is adopted as a heat dissipation fan of a super-thin electronic apparatus. As a result, the influence of thinning of the thickness of the fan on its heat dissipation performance is less so that the technical effect of thinning of the thickness of the heat dissipation fan can be achieved. This is because the blades 102 of the blade wheel of the cross flow fan are not required to be distributed in a helical shape as the blades of the centrifugal fan and the axial fan in the prior art so that the effect of the helical shape of the blades will not be reduced due to thinning of the fan.

Furthermore, in order to ensure heat dissipation effect of the fan after it has been thinned, in the embodiment of the present application, at least one bottom surface of the housing 101 of the super-thin fan is also provided with an axial air inlet 204. As a result, air outside the housing 101 enters into the housing under the influence of a wind pressure and an air flow generated when the blades 102 of the blade wheel rotate, thereby increasing an air input of the super-thin fan and thus improving heat dissipation performance.

In addition, in order to further improve heat dissipation performance, the embodiment of the present application also adopts the crescent axial air inlet 204 which is located in the circular ring-shaped region in the bottom surface of the housing 101. The center of the circular ring-shaped region is the point 103 at which the axis of the blade wheel intersects the bottom surface of the housing, the inner ring radius is equal to the distance from the root of the blade 102 of the blade wheel to the axis of the blade wheel, and the outer ring radius is equal to the distance from the outer edge of the blade 102 of the blade wheel to the axis of the blade wheel. Therefore, air outside the bottom surface of the housing 101 is in more effective contact with the blades 102 of the blade wheel, thereby increasing an axial air input of the super-thin fan and thus improving heat dissipation performance.

Embodiment 3

Figure 3:
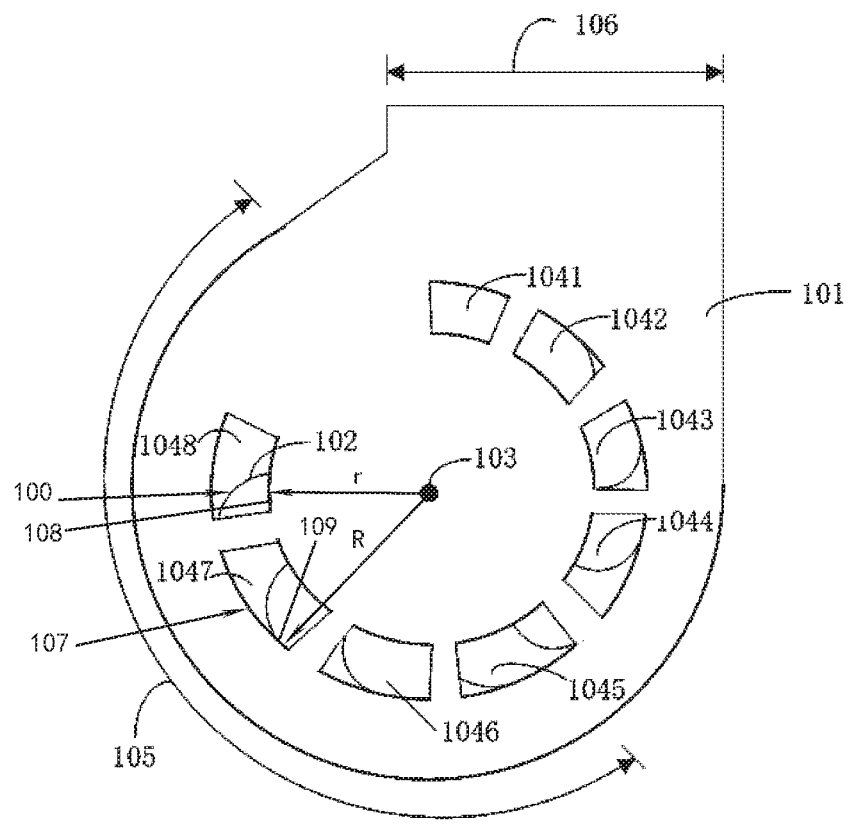
FIG. 3 is a schematic view of a fan having a plurality of axial air inlets according to an embodiment of the present application.

As shown in FIG. 3, a fan and in particular a super-thin cross flow fan are described in the embodiment of the present application. The super-thin fan according to the embodiment comprises a housing 101, blades 102 of a blade wheel 100, a radial air inlet 105, and an air outlet 106 as formed according to the method described in the first embodiment. The super-thin fan further comprises: axial air inlets 1041-1048 disposed in at least one bottom surface of the housing 101. One bottom surface of the housing 101 may be provided with one or more axial air inlets, or each of two bottom surfaces of the housing 101 may be provided with one or more axial air inlets. For purpose of brevity, various alternative arrangements are not illustrated one by one in the embodiment of the present application. With the axial air inlets, air can enter into the housing from the bottom surface of the housing 101 by rotating blades 102 of the blade wheel.

In addition, the axial air inlets 1041-1048 may be disposed in a circular ring-shaped region 107 in the bottom surface of the housing 101. A circular ring center of the circular ring-shaped region is a point 103 at which an axis of the blade wheel intersects the bottom surface of the housing, an inner ring radius r of the circular ring-shaped region 107 is equal to a distance from a root 108 of the blade 102 of the blade wheel to the axis of the blade wheel, and an outer ring radius R of the circular ring-shaped region 107 is equal to a distance from an outer edge 109 of the blade 102 of the blade wheel to the axis of the blade wheel.

Furthermore, the blades 102 of the blade wheel are in contact with air outside the housing 101 through the axial air inlets 1041-1048 in the housing 101.

The technical solutions in the above embodiment of the present application have at least the following technical effects or advantages.

A cross flow fan is adopted as a heat dissipation fan of a super-thin electronic apparatus. As a result, the influence of thinning of the thickness of the fan on its heat dissipation performance is less so that the technical effect of thinning of the thickness of the heat dissipation fan can be achieved. This is because the blades 102 of the blade wheel of the cross flow fan are not required to be distributed in a helical shape as the blades of the centrifugal fan and the axial fan in the prior art so that the effect of the helical shape of the blades will not be reduced due to thinning of the fan.

Furthermore, in order to ensure heat dissipation effect of the fan after it has been thinned, in the embodiment of the present application, at least one bottom surface of the housing 101 of the super-thin fan is also provided with axial air inlets 1041-1048. As a result, air outside the housing 101 enters into the housing under the influence of a wind pressure and an air flow generated when the blades 102 of the blade wheel rotate, thereby increasing an air input of the super-thin fan and thus improving heat dissipation performance.

In addition, in order to further improve heat dissipation performance, the embodiment of the present application also provides the axial air inlets 1041-1048 such that the axial air inlets 1041-1048 are located in the circular ring-shaped region in the bottom surface of the housing 101. The center of the circular ring-shaped region is the point 103 at which the axis of the blade wheel intersects the bottom surface of the housing, the inner ring radius is equal to the distance from the root of the blade 102 of the blade wheel to the axis of the blade wheel, and the outer ring radius is equal to the distance from the outer edge of the blade 102 of the blade wheel to the axis of the blade wheel. Therefore, air outside the bottom surface of the housing 101 is in more effective contact with the blades 102 of the blade wheel, thereby increasing an axial air input of the super-thin fan and thus improving heat dissipation performance.

Embodiment 4

Figure 4:
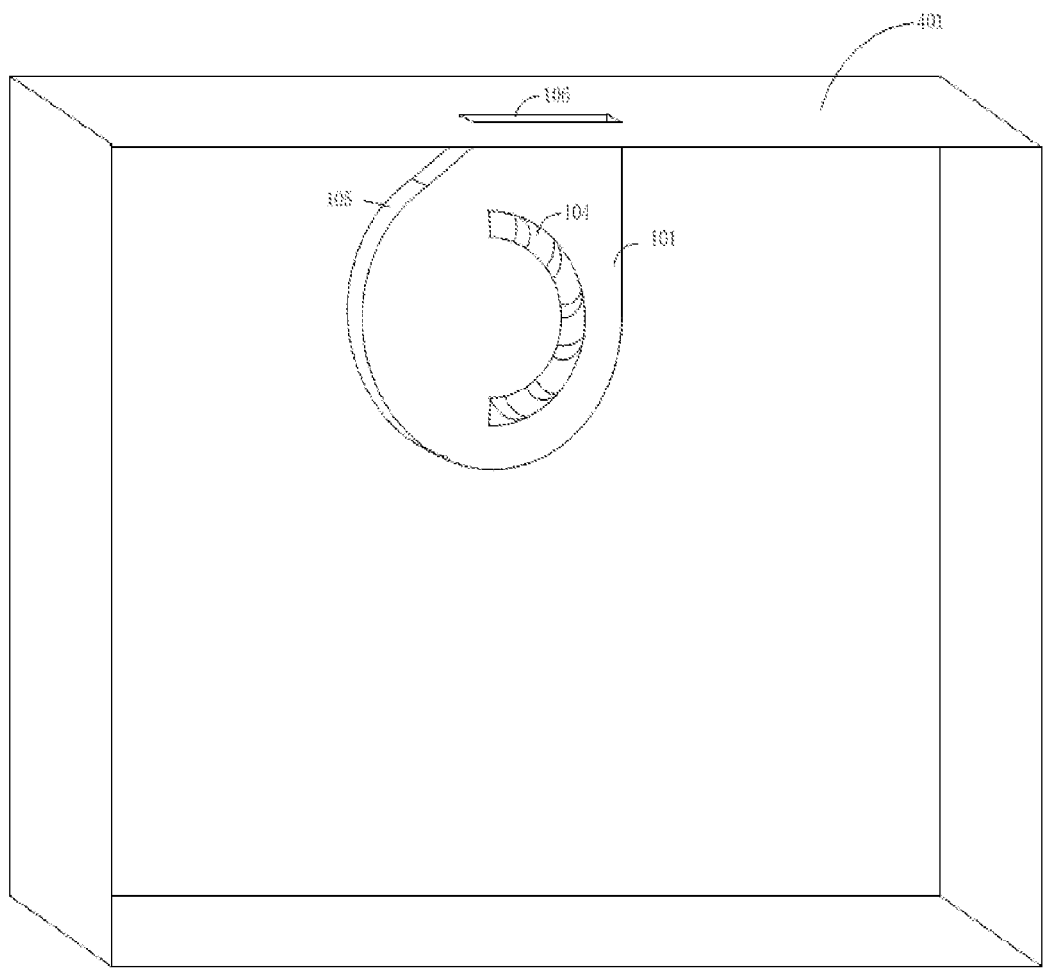
FIG. 4 is a schematic view showing a position of a fan in a case in an embodiment of the present application.

As shown in FIG. 4, in the embodiment of the present application, an electronic apparatus is provided. The electronic apparatus comprises a case 401, and a super-thin cross flow fan made according to the method described in the first embodiment. The radial air inlet 105 and the axial air inlet 104 of the fan are located inside the case.

Furthermore, the fan is fixed to the case 401 by means of a positioning device. The positioning device may be a screw structure, or a bayonet structure. For purpose of brevity, various alternative structures of the positioning device are not illustrated one by one in the embodiment of the present application.

In addition, hot air inside the case 401 can be discharged to an outside of the case 401 through the air outlet 106 of the fan.

The technical solutions in the above embodiment of the present application have at least the following technical effects or advantages.

In the electronic apparatus, a cross flow fan is adopted as a heat dissipation fan of the super-thin electronic apparatus. As a result, the influence of thinning of the thickness of the fan on its heat dissipation performance is less so that the technical effect of thinning of the thickness of the heat dissipation fan and thus super thinning of the electronic apparatus can be achieved. This is because the blades 102 of the blade wheel of the cross flow fan are not required to be distributed in a helical shape as the blades of the centrifugal fan and the axial fan in the prior art so that the effect of the helical shape of the blades will not be reduced due to thinning of the fan.

Furthermore, in order to ensure heat dissipation effect of the fan after it has been thinned, in the embodiment of the present application, at least one bottom surface of the housing 101 of the super-thin fan in the case 401 of the electronic apparatus is also provided with the axial air inlet 104. As a result, air inside the case 401 of the electronic apparatus can enter into the housing 101 of the fan not only from the radial air inlet 105 but also from the axial air inlet 104 and then is discharged through the air outlet 106 of the fan, under the influence of a wind pressure and an air flow generated when the blades 102 of the blade wheel of the fan rotate, thereby increasing an air input of the super-thin fan, improving heat dissipation performance, and thus achieving improvement of heat dissipation performance while super thinning the electronic apparatus.

Although the exemplary preferred embodiments have been shown and described, it would be appreciated by a person skilled in the art that many other modifications or changes in accord with the embodiments can be directly determined or deducted according to disclosure of the present application. Therefore, the appended claims are intended to be construed to include the exemplary preferred embodiments and all of the modifications and variations falling within the scope the present invention.

It will be understood by those skilled in the art that various changes, modifications, substitutions and alterations may be made without departing from the principles and spirit of the present invention. Therefore, if the changes, modifications, substitutions and alterations of the present invention belong to the scope defined in the appended claims of the present invention and their equivalents, the present invention is intended to include the changes, modifications, substitutions and alterations.

What is claimed is:

1. A fan, comprising:
   a housing, wherein the housing is a hollow column, and a thickness of the housing is less than a preset thickness;
   a blade wheel, wherein the blade wheel is mounted in the housing and shaped as a cylinder;
   a radial air inlet and an air outlet which are disposed in a side of the housing; and
   an axial air inlet disposed in at least one bottom surface of the housing so that air can enter into the housing from the bottom surface by rotating the blade wheel; and
   a flow path directly from the axial air inlet to blades of the blade wheel;
   wherein both air entering into the housing from the radial air inlet and air entering into the housing from the axial air inlet are discharged through the air outlet; and
   wherein the axial air inlet has a radially inner edge and a radially outer edge, at least a part of the radially inner edge extends along a first circle along which a blade root of the blade wheel is located, at least a part of the radially outer edge extends along a second circle along which a blade outer edge of the blade wheel is located, and a center of the first circle, a center of the second circle, and an axis of rotation of the blade wheel coincide with one another when viewed in an axial direction of the blade wheel.

2. The fan of claim 1, wherein:
   the axial air inlet has a shape of a sectorial ring or a crescent shape.

3. The fan of claim 2, wherein:
   a ring center of the sectorial ring of the sectorial ring-shaped axial air inlet is the point at which the axis of the blade wheel intersects the bottom surface of the housing.

4. The fan of claim 1, wherein:
   the housing is a housing formed of a metal plate by pressing, a housing formed of plastic by molding, or a housing formed of alloy by molding.

5. The fan of claim 1, wherein:
   the blade wheel comprises at least two forward-curved blades.

6. An electronic apparatus, comprising:
   a case,
   the fan according to claim 1, wherein the radial air inlet and the axial air inlet of the fan are located inside the case; and
   a positioning device for fixing the fan to the case,
   wherein hot air inside the case can be exchanged to an outside of the case through the air outlet of the fan.

7. The fan of claim 1, wherein the flow path extends directly to the blade root of the blade wheel.

* * * * *